(12) United States Patent
Payan et al.

(10) Patent No.: US 9,969,566 B1
(45) Date of Patent: May 15, 2018

(54) MAGNETIC SINGULATOR FOR BULK RAIL FASTENERS

(71) Applicant: NORDCO INC., Oak Creek, WI (US)

(72) Inventors: Julio Enrique Payan, Milwaukee, WI (US); Philip Strydom, Oak Creek, WI (US)

(73) Assignee: NORDCO INC., Oak Creek, WI (US)

( * ) Notice: Subject to any disclaimer, the term of this patent is extended or adjusted under 35 U.S.C. 154(b) by 0 days. days.

(21) Appl. No.: 15/352,013

(22) Filed: Nov. 15, 2016

(51) Int. Cl.
*B65G 11/20* (2006.01)
*B65G 54/02* (2006.01)
*B65G 47/76* (2006.01)
*B65G 11/12* (2006.01)

(52) U.S. Cl.
CPC .......... *B65G 47/763* (2013.01); *B65G 11/123* (2013.01); *B65G 47/766* (2013.01); *B65G 54/02* (2013.01)

(58) Field of Classification Search
CPC ...... B65G 11/20; B65G 11/123; B65G 11/206
USPC ....... 198/381, 453, 454, 468.5, 688.1, 690.1
See application file for complete search history.

(56) References Cited

U.S. PATENT DOCUMENTS

| | | | |
|---|---|---|---|
| 1,615,137 A | 1/1927 | Ruby | |
| 1,747,140 A | 2/1930 | Smith | |
| 1,865,086 A | 6/1932 | Cutler | |
| 2,015,187 A | 9/1935 | Mayer | |
| 2,728,443 A | 12/1955 | Pike, Jr. et al. | |
| 2,818,967 A | 1/1958 | Bogle | |
| 3,203,590 A | 8/1965 | Maki | |
| 3,265,195 A | 8/1966 | Ford | |
| 3,524,532 A | 8/1970 | Hobbs | |
| 3,547,253 A | 12/1970 | Ford | |
| 3,581,665 A | 6/1971 | Johnson | |
| 3,768,626 A | 10/1973 | Vossler et al. | |
| 3,907,099 A | 9/1975 | Smith | |
| 4,014,460 A | 3/1977 | Bryan, Jr. | |
| 4,131,067 A | 12/1978 | Newman et al. | |
| 4,178,237 A | 12/1979 | Theurer | |
| 4,225,429 A | 12/1980 | Holley | |
| 4,618,052 A * | 10/1986 | Rickett | B65G 21/2018 198/370.13 |
| 4,662,506 A | 5/1987 | Tueckmantel et al. | |
| 4,722,283 A | 2/1988 | Holley | |
| 4,727,991 A * | 3/1988 | Mojden | B07C 5/34 198/367 |
| 4,823,931 A * | 4/1989 | Rhodes | B65G 21/2072 198/445 |
| 4,940,001 A | 7/1990 | Holley | |
| 5,191,840 A | 3/1993 | Cotic et al. | |

(Continued)

*Primary Examiner* — Douglas A Hess
(74) *Attorney, Agent, or Firm* — Greer, Barns & Crain, Ltd.

(57) ABSTRACT

A singulator is provided for orienting, sorting and conveying at least one rail fastener, from a bulk supply of such fasteners, and includes a frame defining a lower end and an upper end. A plurality of transverse magnet bars is connected to an endless conveyor system disposed on the frame to move from the lower end to the upper end. A ramp is disposed on the frame, has an underside facing the magnet bars, and an opposite sorting surface opposite the underside and receiving the fasteners. At least one deflector assembly is associated with the ramp and is constructed and arranged for sorting fasteners drawn along the ramp by the magnet bars from the lower end to the upper end so that single fasteners are delivered at the upper end.

19 Claims, 8 Drawing Sheets

(56) References Cited

U.S. PATENT DOCUMENTS

| | | | |
|---|---|---|---|
| 5,385,227 A | | 1/1995 | March |
| 5,398,616 A | | 3/1995 | Eidemanis et al. |
| 5,423,410 A | * | 6/1995 | Keller .................. B65G 47/252 198/406 |
| 5,465,667 A | | 11/1995 | Hosking et al. |
| 5,647,472 A | | 7/1997 | Fierkens |
| 5,678,681 A | | 10/1997 | Klockars et al. |
| 5,680,922 A | * | 10/1997 | Bessels .............. B65G 21/2018 198/396 |
| 5,819,907 A | * | 10/1998 | Simkowski ........ B65G 21/2036 198/689.1 |
| 6,116,409 A | | 9/2000 | Yokajty et al. |
| 6,155,175 A | | 12/2000 | Rude et al. |
| 6,257,395 B1 | | 7/2001 | Yokajty et al. |
| 7,104,200 B2 | | 9/2006 | Hosking et al. |
| 7,216,590 B2 | | 5/2007 | Eldridge et al. |
| 7,244,089 B2 | | 7/2007 | Sperling |
| 7,331,443 B2 | * | 2/2008 | Schoenke .......... B65G 21/2018 198/398 |
| 7,370,409 B2 | * | 5/2008 | Ritter .................... H01R 43/28 140/1 |
| 7,837,022 B2 | * | 11/2010 | Schoenke .......... B65G 21/2018 198/398 |
| 7,966,938 B2 | | 7/2011 | Theurer |
| 8,985,307 B2 | | 3/2015 | Pier et al. |
| 9,324,043 B2 | * | 4/2016 | O'Sullivan ............ G06Q 10/02 |
| 2012/0204752 A1 | * | 8/2012 | Helmick |
| 2013/0186296 A1 | * | 7/2013 | Pier et al. |

\* cited by examiner

MAGNETIC SINGULATOR FOR BULK RAIL FASTENERS

BACKGROUND

The present disclosure generally relates to material handling equipment, and more specifically to rail maintenance equipment for orienting, sorting and conveying rail fasteners, such as rail spikes, to a fastener applicator, such as a spike driver.

While the present application is intended for use in handling and sorting rail spikes, also referred to as cut spikes, it is contemplated that the present invention is usable in orienting, sorting and conveying other rail fasteners, such as lag bolts, hairpin spikes, Lewis bolts, rail clips, rail anchors and the like as well as other fasteners needing repositioning while being conveyed to an operational destination. Thus, "spikes" will be broadly interpreted in the present application to refer to any such rail fasteners.

Conventional railway maintenance machines used to install rail spikes typically receive a supply of rail spikes in bulk, and randomly oriented. Operators need to manually sort and orient the received spikes for eventual loading into a spike driver magazine, a suitable example of which is described in commonly owned U.S. Pat. Nos. 5,191,840; 5,398,616; 7,104,200, all of which are incorporated by reference.

In commonly owned U.S. Pat. No. 8,985,307, an automated singulator provided a mechanism for delivering single spikes from a supply of bulk spikes using a stage-lift mechanism that separates the spikes by sequentially lifting them on vertically reciprocating platforms to gradually reduce the conveyed spike from a small group to a single spike.

In use, the prior singulator was in some cases prone to jamming and snagging due to the introduction of the spikes between moving components. During operation, such jammed spikes must be removed manually and other associated mechanisms are stopped for the removal of the jammed spikes. This results in increased operational expenses and maintenance time. In addition, the prior units included a relatively complicated mechanism for performing singulation, requiring greater than average maintenance. Therefore, there is a need to develop an enhanced singulator that is relatively simple to use and requires reduced labor and maintenance.

SUMMARY

The above-listed needs are met or exceeded by the present singulator, which features a conveyor system constructed and arranged to feed the fasteners at a sufficient speed to a designated destination, such as a spike driver or spiker. A general purpose of the present singulator is to assist in the maintenance and construction of railroad networks, in which specialized machinery, such as spikers, clip applicators and anchor applicators, install steel, preferably ferrous, fasteners that are generally shipped and stored in bulk, including at the worksite and on the work equipment itself. These fasteners are then separated, oriented, and inserted into the workhead mechanism for subsequent operations. In use, the present singulator isolates the fasteners from a bulk supply of such fasteners, and greatly reduces a number of actuators and complex moving parts while improving serviceability.

Specifically, the present singulator provides an automated separation of railroad fasteners from a bulk loading bin onboard a spiker or other similar piece of railway maintenance equipment without manual intervention. This greatly reduces labor requirements of spike sorting. Further, the present singulator reduces the complexity of moving components compared to conventional singulators.

More specifically, in one embodiment, a singulator is provided for orienting, sorting and conveying at least one rail fastener from a bulk supply of such fasteners, and includes a frame defining a lower end and an upper end. A plurality of transverse magnet bars is connected to an endless conveyor system disposed on the frame to move from the lower end to the upper end. A ramp is disposed on the frame, has an underside facing the magnet bars, and an opposite sorting surface opposite the underside and receiving the fasteners. At least one deflector assembly is associated with the ramp and is constructed and arranged for sorting fasteners drawn along the ramp by the magnet bars from the lower end to the upper end so that single fasteners are delivered at the upper end.

In another embodiment, a singulator is provided for orienting, sorting and conveying at least one rail fastener from a bulk supply of such fasteners, and includes a frame defining a lower end and an upper end. A plurality of transverse magnet bars is connected to an endless conveyor system disposed on the frame to move from the lower end to the upper end. A ramp is disposed on the frame and having an underside facing the magnet bars, and an opposite sorting surface opposite the underside and receiving the fasteners. At least one deflector assembly is associated with the ramp and is constructed and arranged for sorting fasteners drawn along the ramp by the magnet bars from the lower end to the upper end so that single fasteners are delivered at the upper end. Each magnet bar is formed by a plurality of individual magnets arranged transversely to a direction of travel of the endless conveyor system.

In yet another embodiment, a singulator is provided for orienting, sorting and conveying at least one rail fastener, from a bulk supply of such fasteners, and includes a frame defining a lower end and an upper end. A plurality of transverse magnet bars is connected to an endless conveyor system disposed on the frame to move from the lower end to the upper end. A ramp is disposed on the frame, has an underside facing the magnet bars, and an opposite sorting surface opposite the underside and receiving the fasteners. At least one deflector assembly is associated with the ramp and is constructed and arranged for sorting fasteners drawn along the ramp by the magnet bars from the lower end to the upper end so that single fasteners are delivered at the upper end. The transverse magnet bars are spaced from each other at a predetermined distance along a delivery path of the at least one rail fastener.

DETAILED DESCRIPTION

Referring now to FIGS. 1-3 and 4A-4B, the present singulator, generally designated 10, is constructed and arranged to orient, sort and convey one or more rail fasteners 11, such as rail spikes, from a bulk supply of such fasteners for performing various rail maintenance operations. Included in the present singulator 10 is an endless conveyor system, generally designated 12, configured for orienting, sorting, and conveying the rail fasteners 11 deposited at the bottom of the conveyor system. During operation, the fasteners 11 are conveyed upwardly on a sloped ramp 14 of the conveyor system 12 using a magnetic belt system, generally designated 16.

A basic support structure of the magnetic belt system 16 includes a self-supporting frame 18, preferably incorporating a pair of side rails 20 held together by a plurality of cross-braces (not shown), defining a lower end 21 and an upper end 23. It is contemplated that the specific configuration of the frame 18 may vary to suit the situation, and the side rails 20 may be replaced by other equivalent supporting structure as known in the art. A plurality of pulleys 22 is supported by the frame 18 and the individual pulleys are connected together by at least one endless moving member 24, such as a belt or chain (FIGS. 4B and 5B) as is well known in the conveying art. The endless moving member 24 passes around the frame 18 to form a delivery track or path of the fasteners 11 on the ramp 14. It is contemplated that the ramp 14 is made of materials that allow magnetic force to pass through, such stainless steel, but other suitable materials are contemplated to suit the application. Also, the ramp 14 is associated with, and is preferably secured to the frame 18 using conventional threaded fasteners, welding or similar fastening technologies.

In the preferred embodiment, the magnetic belt system 16 includes a plurality of transverse magnet bars 26 (FIG. 4B) connected to the endless conveyor system 12 disposed on the frame 18 to move from the lower end 21 to the upper end 23. Each magnet bar 26 is formed by a plurality of individual magnets 28 arranged transversely to a direction of travel of the endless conveyor system 12, and being movable by the endless belt or chain 24 along a longitudinal direction of the ramp 14 as it extends from the lower end 21 to the upper end 23. It is contemplated that each row of the magnet bar 26 has approximately six to eight magnets 28 arranged in side-by-side fashion to traverse a width of the ramp 14. The number of magnets 28 in the magnet bar 26 is variable to suit different applications. Each magnet 28 of each magnet bar 26 is contained, at least partially, in a protective plastic enclosure 30.

Figure 1:
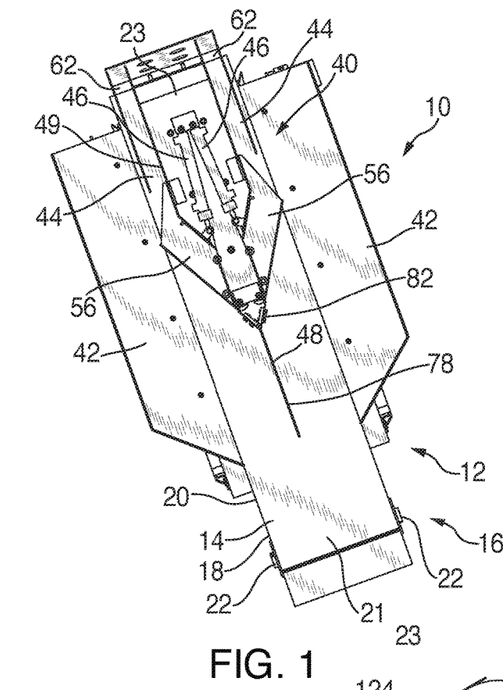
FIG. 1 is a front view of the present singulator, featuring a conveyor system.
Figure 2:
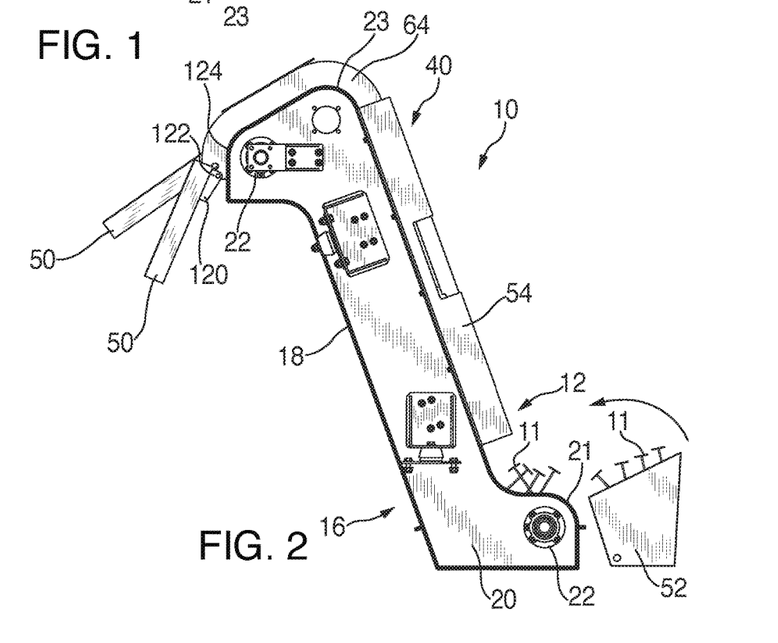
FIG. 2 is a side view of the present singulator of FIG. 1.
Figure 3:
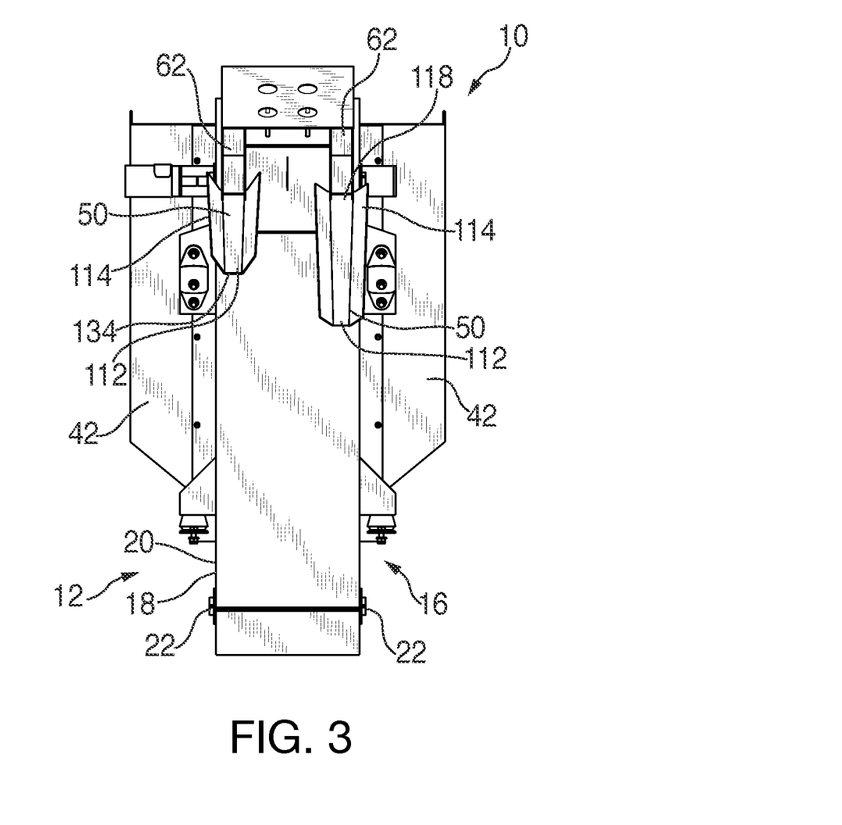
FIG. 3 is a rear view of the present singulator of FIG. 1.
Figures 4A, 4B:
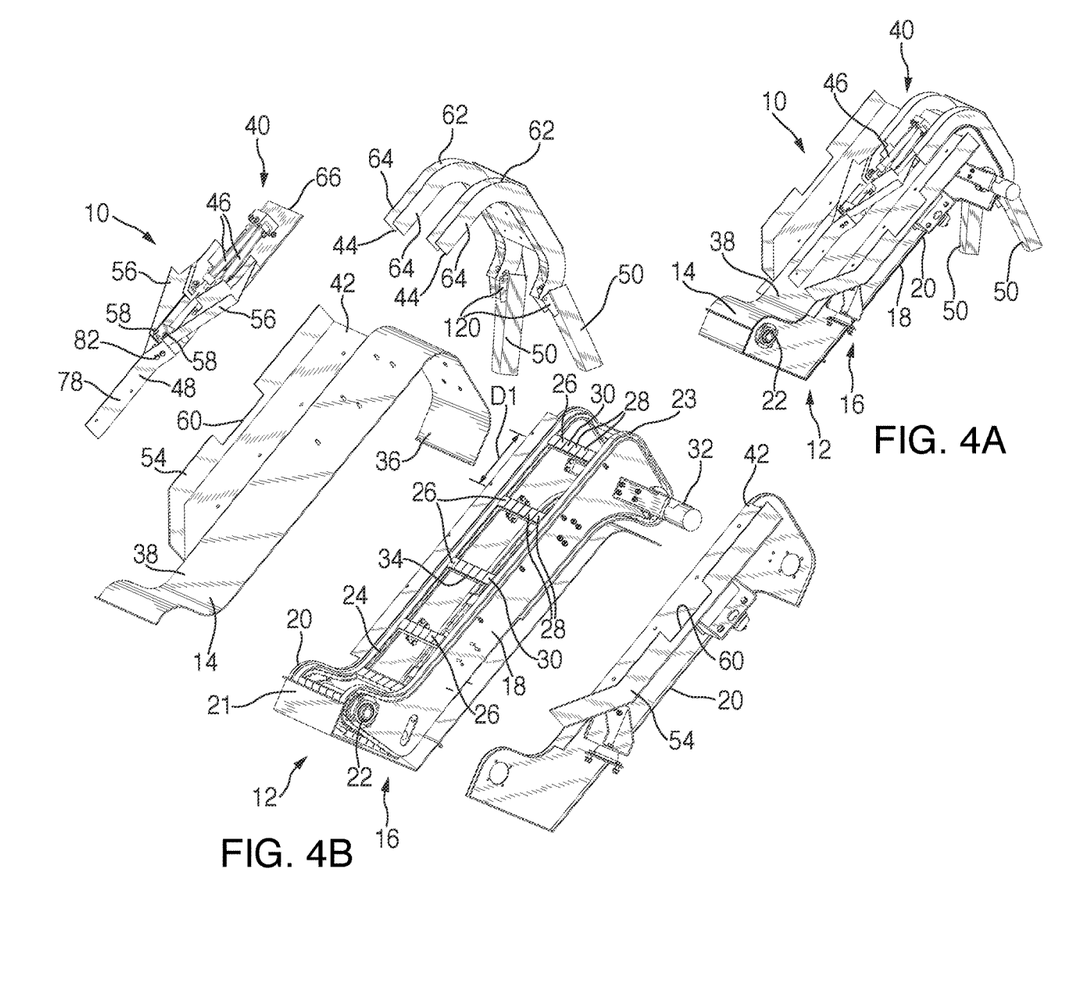
FIG. 4A is a side perspective view of the present singulator of FIG. 1.
FIG. 4B is a partial exploded perspective view of the present singulator of FIG. 4A.
Figure 5A:
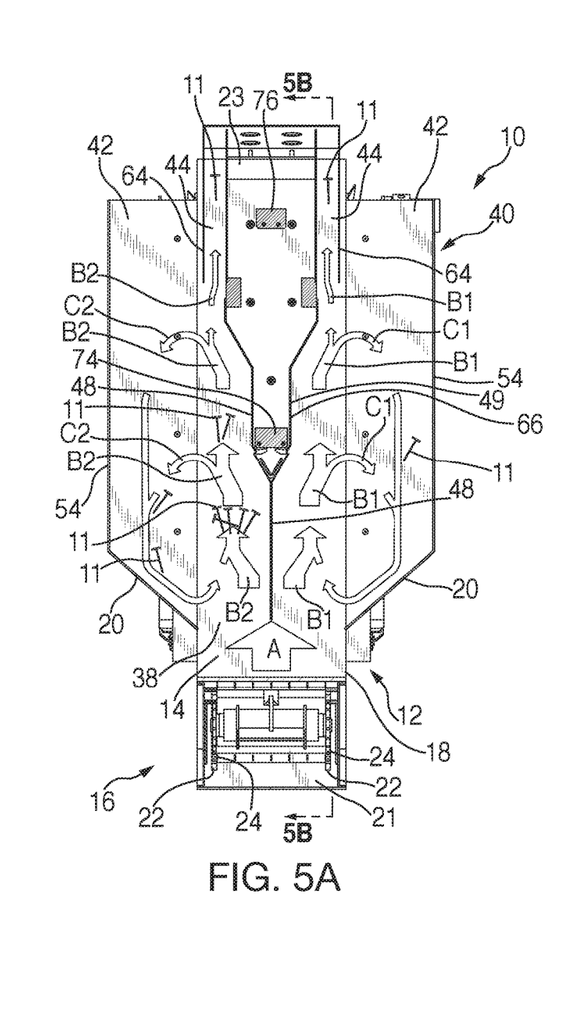
FIG. 5A is a front view of the present singulator, depicting a delivery flow of the rail fasteners on the conveyor system.
Figure 5B:
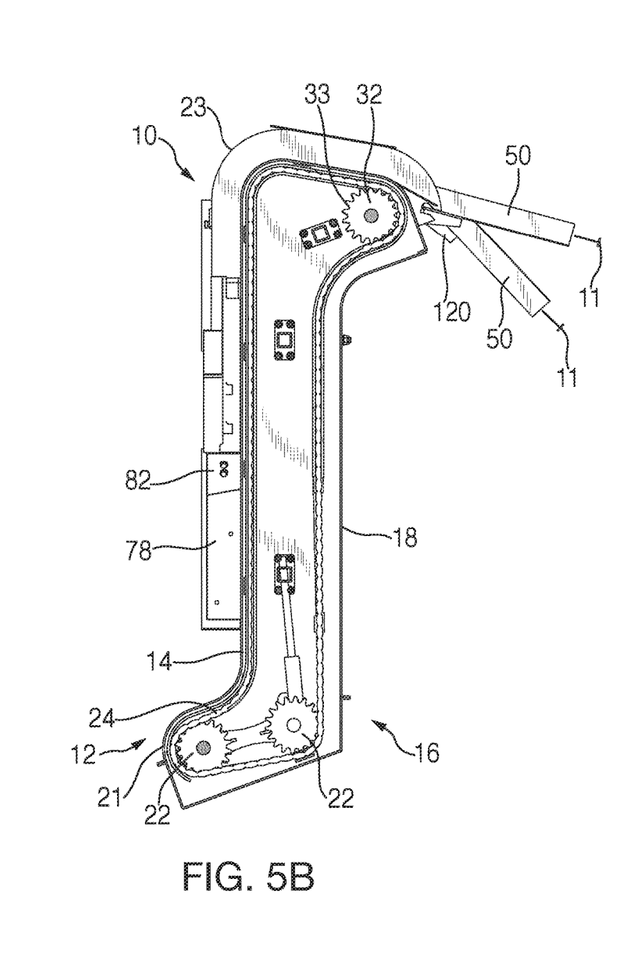
FIG. 5B is a vertical cross-section of the present singulator, taken along the line 5B-5B of FIG. 5A and in the direction generally indicated.

Referring now to FIGS. 4B, 5A and 5B, a hydraulic motor 32 is provided to power the magnetic belt system 16, and includes at least one drive sprocket 33 that positively engages a corresponding one of the endless moving members 24, but it is contemplated that alternate power sources include electric or pneumatic motors or actuators as are known in the art. An upper surface 34 (FIG. 4B) of each enclosure 30 is designed to substantially directly engage an underside 36 of the ramp 14 for reducing friction and also allowing the magnets 28 to attract and move ferrous items, such as the rail fasteners, on an opposite outer or sorting surface 38 of the ramp under the action of magnetic force of each magnet bar 26. It is preferred that the ramp 14 is disposed on the frame 18 and has the underside 36 facing the magnet bars 26, and the opposite sorting surface 38 opposite the underside and receiving the fasteners 11.

While a quadrilateral shape is shown for the magnets 28 and the enclosures 30, other suitable shapes, such as round or oval configurations, are contemplated to suit different applications. It is contemplated that each magnet 28 can be a permanent magnet or an electromagnet configured for generating sufficient magnetic force to move the rail fasteners 11 on the sorting surface 38 of the central ramp 14. For the magnetic belt system 16, alternative driving mechanisms include belt or gear drives.

Referring now to FIGS. 1, 4A, 4B and 5A, an important aspect of the present singulator 10 is that at least one deflector assembly 40 is constructed and arranged for sorting the fasteners 11 drawn along the ramp 14 by the magnet bars 26 from the lower end 21 to the upper end 23 so that single fasteners are delivered at the upper end. It is contemplated that the deflector assembly 40 is mounted to the ramp 14, and is configured for partially obstructing a delivery flow of the fasteners 11 on the sorting surface 38. In the preferred embodiment, a pair of side ramps 42 and a pair of corresponding side gates 44 are provided to guide the delivery flow of the fasteners 11. It is contemplated that the deflector assembly 40 includes one or more fluid power actuators 46 described in further detail below which are designed to clear obstructions to the delivery flow of the fasteners 11 in case of a fastener jam or obstruction caused by excessive fasteners or non-fasteners, and also to control or limit the delivery flow of the fasteners 11 to at least one of opposite sides on the ramp 14. It is preferred that the side ramps 42 are relatively flush with the ramp 14.

At least one deflector 48 (FIGS. 4B and 5A) is attached to the deflector assembly 40 along a longitudinal direction of the sorting surface 38 of the ramp 14 such that the fasteners 11 are deflected as they are being moved upwardly by the magnetic force of the magnet bar 26. In the preferred embodiment, the deflector 48 includes walls 49 that project perpendicularly from the outer sorting surface 38 and that contact and divert fasteners 11 moving along the surface 38 from the lower end 21 to the upper end 23. At least one gravity return chute 50 connected to the upper end 23 is connected to an upper portion of the deflector assembly 40 for receiving the singulated fasteners 11 and allowing the fasteners to fall away directly into a staging area for subsequent operations. Detailed movement of the fasteners 11 on the conveyor system 12 is described below in paragraphs related to FIGS. 5A-6B.

Referring now to FIGS. 4A-4B and 5A-5B, a main movement of the rail fasteners 11 is upward and to lateral sides of the present singulator 10. Specifically, during operation, as the fasteners 11 are attracted and picked up from a bulk loading bin 52 (FIG. 2) by the moving magnet bar 26, clumps or groups of the fasteners are moved upwardly on the ramp 14, as designated by an arrow A (FIG. 5A). For example, each clump having approximately 10-80 rail fasteners is pushed from the bin 52 onto the conveyor lower end 21 and subsequently magnetically moved by the magnetic belt system 16. It is contemplated that the conveyor system 12 can feed the fasteners 11 directly from the bin 52 to suit different applications.

As the fastener clumps are moved upwardly on the ramp 14, the deflector 48 initially separates the fasteners 11 into two separate delivery flows, as designated by arrows B1 and B2 (FIG. 5A), on the sorting surface 38 of the central ramp. While a bifurcated delivery flow B1, B2 is shown for illustration purposes, single or multiple delivery flows are also contemplated to suit different applications.

Another important aspect of the present singulator 10 is that the walls 49 of the deflector 48 are constructed and arranged to form a gradually narrower delivery path for the fasteners 11 as they are moved upwardly toward the upper end 23 of the ramp 14. In this configuration, as the walls 49 and the deflector 48 divert the upwardly moving fasteners 11 to side edges of the magnetic field of each magnet bar 26, individual fasteners become aligned in a longitudinal direction with the ramp 14. Similarly, as the fasteners 11 reach the side gates 44, properly aligned fasteners enter the gates, and improperly oriented fasteners located outside the gates encounter the weaker magnetic field at the edges of the ramp 14 and fall upon the side ramps 42.

At the same time, the fasteners 11 move from a center of the ramp 14 to the side edges, where the magnetic force of the magnet bar 26 weakens. As such, the fasteners are more easily dislodged and fall from the side edges, as designated by arrows C1 and C2 (FIG. 5A). Fallen fasteners 11 are caught by side panels 54 mounted to outer edges of, and projecting generally perpendicularly from, the side ramps 42 and returned to the lower end 21 of the conveyor system 12 by gravity, where the bulk loading bin 52 is located. It is preferred that the side panels 54 project normally to the side ramps 42.

For avoiding interactions between respective clumps of fasteners 11, such as unwanted "bridging" or "chaining," the magnet bars 26 are sufficiently spaced at a predetermined distance D1 (FIG. 4B) along the delivery track of the fasteners. Further, this spacing between two adjacent magnet bars 26 provides a sufficient clearance for the fasteners 11 to be reoriented without interfering with a transport of subsequently delivered fasteners. An exemplary distance D1 ranges between approximately 10-11.5 inches.

Figure 6A:
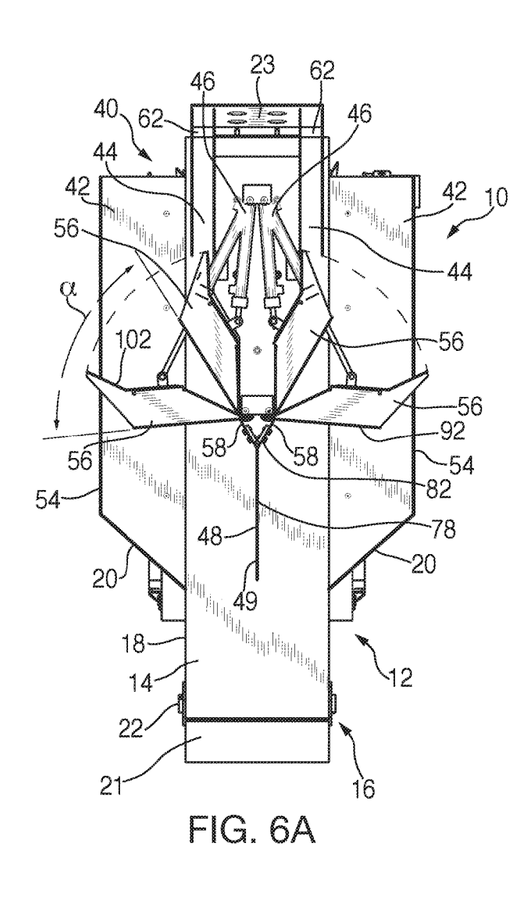
FIG. 6A is a front view of the present singulator, featuring a deflector having a pair of wings.
Figure 6B:
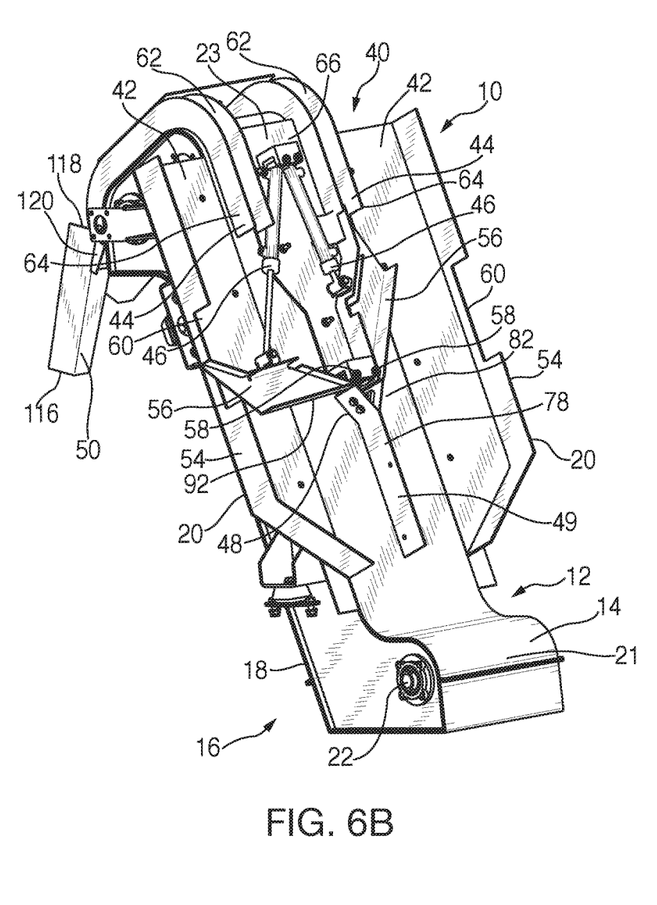
FIG. 6B is a side perspective view of the present singulator of FIG. 6A.

Referring now to FIGS. 4B and 6A-6B, it is preferred that the deflector assembly 40 includes a pair of pivoting flaps or wings 56 configured for pivoting about respective pivot points 58 to transition between an extended position and a retracted position. A pivoting action of each wing or flap 56 is controlled by the actuator 46, such as a fluid-powered cylinder, for facilitating removal of jammed or doubly stacked fasteners, and for selectively blocking the delivery flow of the fasteners 11 to at least one side path on the ramps 42 to vary the corresponding delivery flow and/or output rate, as desired.

For example, when two or more fasteners 11 are traveling in the delivery path on the ramp 14, the fasteners may become jammed or stacked up vertically on the sorting surface 38 caused by the magnetic force transferred from the magnet bars 26. To push away jammed or stacked up fasteners 11 into the side ramps 42, the wings 56 transition from the retracted position to the extended position by pivoting outwardly about the pivot points 58 at a predetermined angle α (FIG. 6A). An exemplary predetermined angle α is approximately 60 degrees. The wings 56 are set at a height or spacing from the conveyor sorting surface 38 such that only a single fastener or spike 11 can proceed upwards toward the upper end 23.

As the jammed or stacked up fasteners 11 are pushed away, the separated fasteners become disengaged from the magnetic force of the magnet bar 26 and fall by gravity down to the lower end 21 and optionally into the bulk loading bin 52 via the respective side ramps 42. While pivoting actions are described for illustration purposes, different types of pushing actions, such as diagonal or horizontal movement, are contemplated for the wings or flaps 56 to suit different applications. A notch 60 (FIGS. 4B and 6B) is disposed optionally on each side panel 54 of the respective side ramps 42 for accommodating the pivoting action of each flap or wing 56.

Near the upper end 23 of the central ramp 14, a pair of the chutes 50 is disposed on opposite sides of the deflector assembly 40 for creating two narrow passages 62 leading to a subsequent work area. Each passage 62 is dimensioned to accommodate insertion of a single fastener 11. Excessive fasteners that are held together by the magnetic force are separated by outer walls 64 of the respective passages 62, and fall into the bulk loading bin 52 via the respective side ramps 42 by gravity. After delivering the fasteners 11 through the passages 62 and chutes 50, the fasteners are fed to a heads-up tray (not shown), which allows tips of the fasteners to pass through but retains heads of the fasteners due to a size difference between the tips and heads.

Figure 7:
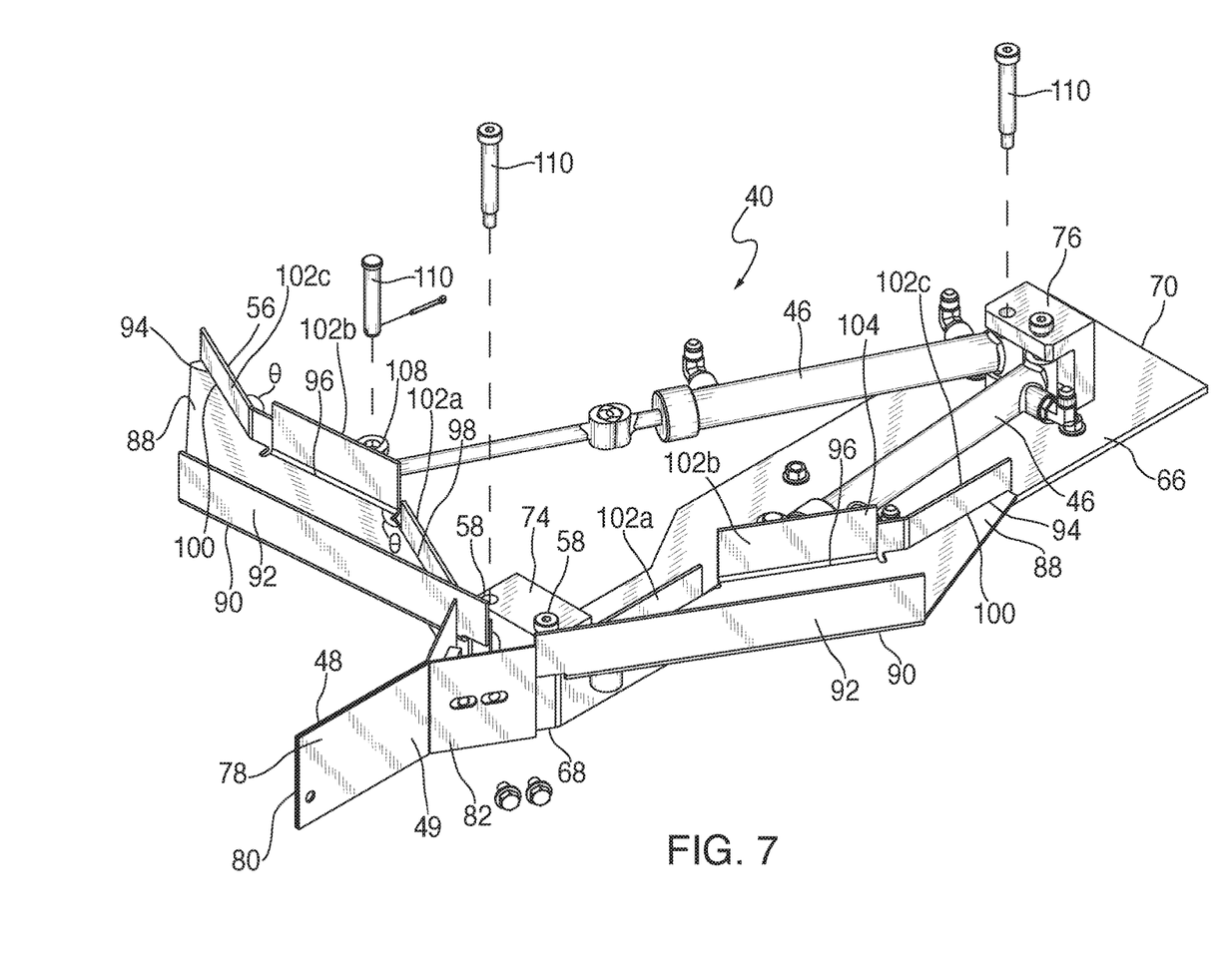
FIG. 7 is a top perspective view of the present deflector assembly.
Figure 8:
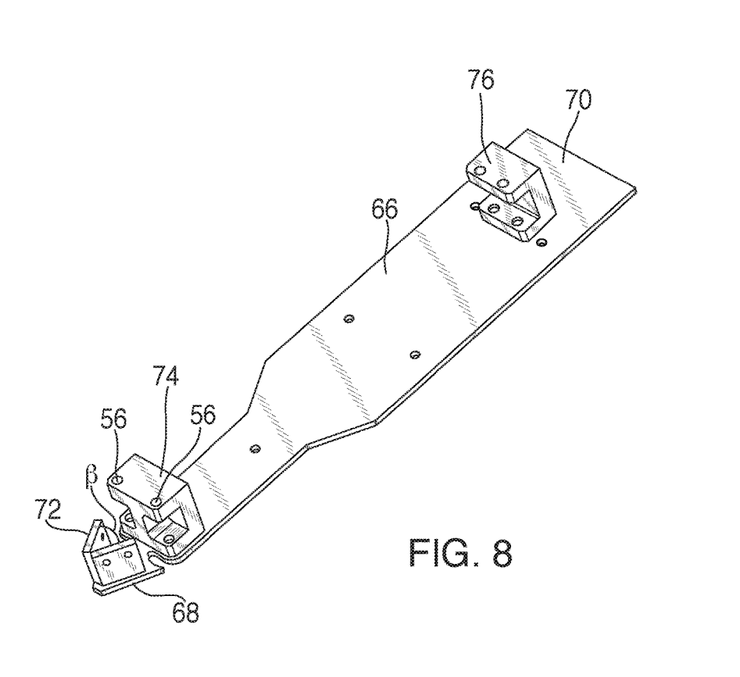
FIG. 8 is a top perspective view of a base for the assembly of FIG. 7.
Figure 9:
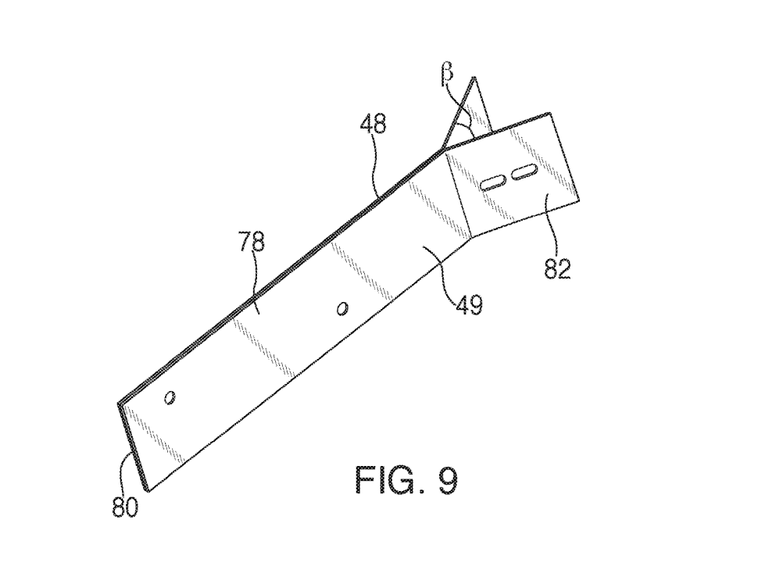
FIG. 9 is a top perspective view of the present diverter blade for the assembly of FIG. 7.

Referring now to FIGS. 7-9, the deflector assembly 40 is shown in greater detail. A generally planar base 66 is connected to the ramp 14, as by threaded fasteners or the like, and includes a deflector mounting end 68 and an opposite actuator mounting end 70. At the deflector mounting end 68, a generally "V"-shaped deflector bracket 72 projects generally perpendicularly from the base, and defines an acute angle β, in the general range of 30°. Also mounted closely adjacent the deflector bracket 72 is a wing bracket 74 defining the pair of wing pivot points 58. An actuator bracket 76 is mounted in operational relationship to the actuator mounting end 70.

The deflector 48 having the walls 49 has a general "Y"-shape, with an elongate blade 78, generally axially oriented in the direction of flow of the fasteners 11 up the ramp 14. A free end 80 of the blade 78 extends toward the lower end 21 of the ramp 14, and an opposite bifurcated end 82 forms a general "V"-shape that is complementary to the deflector bracket 72. In addition, the angle β formed by the bifurcated end 82 has been found to satisfactorily split the flow of the fasteners 11 as they move up the ramp 14.

Referring now to FIGS. 7 and 9, it will be noted that the length of the free end 80 of the blade 78 is variable, however it is preferred that the free end is at least as long as the bifurcated end 82. In addition, the bifurcated end 82 includes at least one mounting aperture for securing the deflector 48 to the deflector bracket 72 using fasteners 86, such as threaded bolts or the like.

Figures 10, 11:
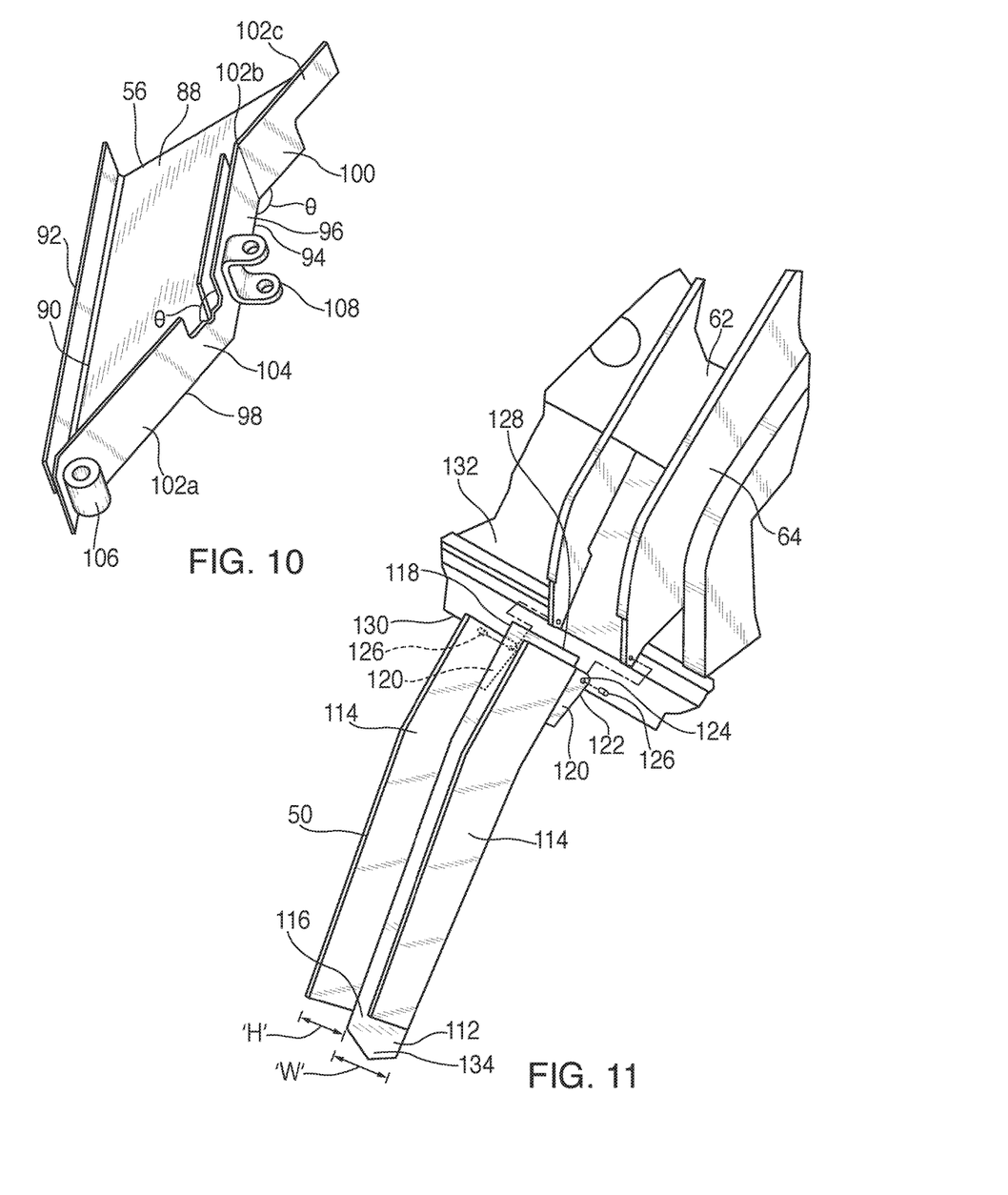
FIG. 10 is a top perspective view of the present diverter wing for the assembly of FIG. 7.
FIG. 11 is a top perspective view of an exit chute of the singulator of FIG. 1.

Referring now to FIGS. 7 and 10, the wings 56 include a generally planar panel 88 with a first edge 90 from which generally perpendicularly projects a preferably straight fastener wall 92. The fastener wall 92 engages vertically stacked fasteners 11 and knocks the uppermost fastener free, so that they fall toward the lower end 21 and allow the singulated fastener 11 to proceed towards the passage 62. Opposite the first edge 90, a second edge 94 has three portions, a center portion 96 generally parallel to the first edge, and sandwiched between outer portions 98 and 100 being parallel to each other and oriented at an obtuse angle θ relative to the central portion. An actuator wall 102 projects generally perpendicularly from the second edge 94 and has three angled portions 102a, 102b, and 102c corresponding to the edge portions 98, 96 and 100. A rear or actuator surface 104 of the wall 102 is the mounting point for a pivot bracket 106, and an actuator bracket 108. An end of the actuator 46 is pivotally engaged in the actuator bracket 108, using pins or fasteners 110. A similar pin 110 is engaged in the pivot bracket 106. Thus, extension and retraction of the actuator 46 will move the wings 56 arcuately relative to the base 66.

Referring now to FIGS. 2, 5B, 6B and 11, the chute 50 is shown in greater detail. Included in the chute 50 is a generally planar floor 112 and a pair of generally perpendicularly extending chute walls 114 which together form a general "U"-shape when viewed in vertical cross-section. In the preferred embodiment, the chute floor 112 has a width 'W' and the chute walls 114 have a height 'H'. In the preferred embodiment, 'H' and 'W' are approximately equal, however other dimensions are contemplated. The chute 50 has a free end 116 and an opposite pivot end 118, having a pair of depending tapered brackets 120 extending in an opposite direction from the floor 112 from the walls 114. Each bracket 120 has a taller end 122 with a transverse mounting bore 124 used to connect the chute 50 to the outer walls 64 using fasteners 126. In the preferred embodiment, the chute floor 112 has a pivot end lip 128 extending axially past the chute walls 114 to engage an edge 130 of a wall support plate 132 supporting the walls 64. Also, a free end 134 of the chute floor 112 extends past associated ends of the chute walls 114.

While a particular embodiment of the present magnetic singulator for bulk rail fasteners has been described herein, it will be appreciated by those skilled in the art that changes and modifications may be made thereto without departing from the invention in its broader aspects and as set forth in the following claims.

What is claimed is:

1. A singulator for orienting, sorting and conveying at least one rail fastener, from a bulk supply of such fasteners, comprising:
    a frame defining a lower end and an upper end;
    a plurality of magnet bars connected to an endless conveyor system disposed on said frame to move from said lower end to said upper end;
    a ramp disposed on said frame and having an underside facing said magnet bars, and an opposite sorting surface opposite said underside and receiving the fasteners; and
    at least one deflector assembly associated with said ramp, and constructed and arranged for sorting fasteners drawn along said ramp by said magnet bars from said lower end to said upper end so that single fasteners are delivered at said upper end.

2. The singulator of claim 1, wherein each said magnet bar is formed by a plurality of individual magnets arranged transversely to a direction of travel of said endless conveyor system.

3. The singulator of claim 2, wherein said individual magnet is enclosed by an enclosure configured for substantially directly engaging an underside of the ramp.

4. The singulator of claim 1, wherein said endless conveyor system includes a plurality of pulleys supported by said frame and connected together by an endless moving member, and said magnet bars being connected to said endless moving member.

5. The singulator of claim 1, wherein two adjacent magnet bars are spaced at a predetermined distance along a delivery path of the at least one rail fastener.

6. The singulator of claim 1, wherein said deflector assembly is mounted to said ramp and configured for partially obstructing and directing a delivery flow of the at least one fastener.

7. The singulator of claim 6, wherein said deflector assembly includes a pair of side ramps and a pair of corresponding side gates.

8. The singulator of claim 6, wherein said deflector assembly includes at least one actuator configured for clearing obstructions to a delivery flow of the at least one fastener.

9. The singulator of claim 6, wherein at least one generally "Y"-shaped deflector is attached to said deflector assembly along a longitudinal direction of said ramp.

10. The singulator of claim 9, wherein the at least one deflector is constructed and arranged to form a gradually narrower delivery path for the at least one rail fastener upwardly toward said upper end of said frame.

11. The singulator of claim 6, wherein at least one return chute is connected to an upper portion of the deflector assembly for allowing the at least one fastener to fall away into a staging area for subsequent operations.

12. The singulator of claim 6, wherein said deflector assembly includes a pair of pivoting wings configured for transitioning between an extended position and a retracted position at a predetermined angle.

13. The singulator of claim 12, wherein a notch is disposed on each side panel of a respective side ramp of the conveyor system for accommodating the pivoting action of each wing.

14. The singulator of claim 6, wherein said deflector assembly includes a pair of pivoting wings configured for selectively blocking at least one delivery path of the at least one rail fastener on said ramp to control a delivery flow and output rate of the delivered fasteners.

15. The singulator of claim 6, wherein at least one passage leading to a subsequent work area is disposed on said deflector assembly.

16. The singulator of claim 15, wherein the at least one passage is dimensioned to accommodate insertion of a single fastener.

17. The singulator of claim 15, wherein one or more fasteners held together by the magnetic force are separated by an outer wall of the at least one passage.

18. A deflector for use with a singulator for orienting, sorting and conveying at least one rail fastener, from a bulk supply of such fasteners, the singulator including:
    a frame defining a lower end and an upper end;
    a plurality of magnet bars connected to an endless conveyor system disposed on said frame to move from said lower end to said upper end;
    a ramp disposed on said frame and having an underside facing said magnet bars, and an opposite sorting surface opposite said underside and receiving the fasteners;
    at least one deflector assembly associated with said ramp, and constructed and arranged for sorting fasteners drawn along said ramp by said magnet bars from said lower end to said upper end so that single fasteners are delivered at said upper end;
    said deflector including an elongate blade having a free end and an opposite bifurcated end defining an acute angle, said free end being at least as long as said bifurcated end.

19. A wing configured for use with a singulator constructed and arranged for orienting, sorting and conveying at least one rail fastener, from a bulk supply of such fasteners, the singulator including:
- a frame defining a lower end and an upper end;
- a plurality of magnet bars connected to an endless conveyor system disposed on said frame to move from said lower end to said upper end;
- a ramp disposed on said frame and having an underside facing said magnet bars, and an opposite sorting surface opposite said underside and receiving the fasteners;
- at least one deflector assembly associated with said ramp, and constructed and arranged for sorting fasteners drawn along said ramp by said magnet bars from said lower end to said upper end so that single fasteners are delivered at said upper end; and
- said wing including a generally planar panel with a first edge from which generally perpendicularly projects a fastener wall, constructed and arranged for engaging vertically stacked fasteners and knocking an uppermost fastener free;
- a second edge opposite said first edge and having three portions, a center portion generally parallel to said first edge, and being sandwiched between outer portions that are parallel to each other and oriented at an obtuse angle relative to the central portion;
- an actuator wall projects generally perpendicularly from said second edge and has three angled portions corresponding to said edge portions; and
- a rear surface of said actuator wall is a mounting point for a pivot bracket and an actuator bracket.

* * * * *